United States Patent
Volk

(10) Patent No.: US 10,070,638 B2
(45) Date of Patent: Sep. 11, 2018

(54) MULTIPLE PURPOSE ICE FISHING BUCKET LID DEVICE

(71) Applicant: Tom Volk, Lincoln, ND (US)

(72) Inventor: Tom Volk, Lincoln, ND (US)

( * ) Notice: Subject to any disclaimer, the term of this patent is extended or adjusted under 35 U.S.C. 154(b) by 227 days.

(21) Appl. No.: 15/001,915

(22) Filed: Jan. 20, 2016

(65) Prior Publication Data

US 2017/0202196 A1    Jul. 20, 2017

(51) Int. Cl.

| | | |
|---|---|---|
| *A01K 97/05* | (2006.01) | |
| *A01K 97/01* | (2006.01) | |
| *A01K 97/00* | (2006.01) | |
| *A01K 97/22* | (2006.01) | |
| *A01K 97/10* | (2006.01) | |

(52) U.S. Cl.
CPC .............. *A01K 97/05* (2013.01); *A01K 97/00* (2013.01); *A01K 97/01* (2013.01); *A01K 97/10* (2013.01); *A01K 97/22* (2013.01)

(58) Field of Classification Search
CPC ........ A01K 97/05; A01K 63/02; A01K 97/20; A01K 97/01; A01K 97/04; A01K 97/10; A01K 97/22; A01K 85/18; A01K 97/00; A01K 97/08; B65D 51/24; B65D 47/06; B65D 43/02; B65D 43/163; B65D 51/18; B65D 1/265; B65D 21/0209; B65D 51/28; B65D 21/0231; B65D 71/70; B65D 25/06; B65D 23/12; B65D 25/10
USPC .............................. 43/55, 56, 54.1
See application file for complete search history.

(56) References Cited

U.S. PATENT DOCUMENTS

| | | | | |
|---|---|---|---|---|
| 1,385,792 A | * | 7/1921 | Petty | A01K 97/05 43/55 |
| 2,604,579 A | * | 7/1952 | Deneboudes | A47G 23/0241 362/101 |
| 3,751,845 A | * | 8/1973 | van Leeuwen | A01K 97/05 206/542 |
| 4,503,563 A | | 3/1985 | Johnson | |
| 4,845,881 A | | 7/1989 | Ward | |
| 4,896,452 A | | 1/1990 | Smith et al. | |
| 5,303,500 A | | 4/1994 | Luukonen | |
| 5,305,544 A | | 4/1994 | Testa, Jr. | |
| 5,319,877 A | | 6/1994 | Hagan | |
| 5,586,805 A | * | 12/1996 | Rinehart | A01K 97/22 206/216 |
| 5,634,291 A | | 1/1997 | Pham | |
| 5,671,856 A | * | 9/1997 | Lisch | A01K 97/06 206/519 |
| 6,729,066 B1 | * | 5/2004 | Howley | A01K 97/05 43/54.1 |
| 6,820,364 B1 | | 11/2004 | Tyson | |
| 8,756,856 B1 | | 1/2014 | Girvin | |

(Continued)

*Primary Examiner* — Kathleen Iwasaki Alker
*Assistant Examiner* — Jeffrey R Larsen

(57) ABSTRACT

A multiple purpose ice fishing bucket lid device provides a seat, storage, and additional functionality in a lid for covering a bucket. The device includes a housing for coupling to a bucket such that the housing covers the bucket. The housing defines an interior space. A pail is couplable to the housing wherein the pail extends into the interior space for holding bait. The pail is alternatively couplable to the housing in an inverted position wherein the pail extends upwardly relative to a top wall of the housing defining an elongated compartment with the interior space and an interior of the bucket for holding an elongated implement such as an ice fishing rod.

9 Claims, 5 Drawing Sheets

(56) References Cited

U.S. PATENT DOCUMENTS

| | | |
|---|---|---|
| 8,806,803 B1 | 8/2014 | Mitchell |
| 2013/0227875 A1* | 9/2013 | DeSpiegelaere ....... A01K 97/01 43/54.1 |

* cited by examiner

MULTIPLE PURPOSE ICE FISHING BUCKET LID DEVICE

BACKGROUND OF THE DISCLOSURE

Field of the Disclosure

The disclosure relates to bucket lid devices and more particularly pertains to a new bucket lid device for provide a seat, storage, and additional functionality in a lid for covering an ice fishing bucket.

SUMMARY OF THE DISCLOSURE

An embodiment of the disclosure meets the needs presented above by generally comprising a housing for coupling to a bucket such that the housing covers the bucket. The housing defines an interior space. A pail is couplable to the housing wherein the pail extends into the interior space for holding bait. The pail is alternatively couplable to the housing in an inverted position wherein the pail extends upwardly relative to a top wall of the housing defining an elongated compartment with the interior space and an interior of the bucket for holding an elongated implement such as an ice fishing rod.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
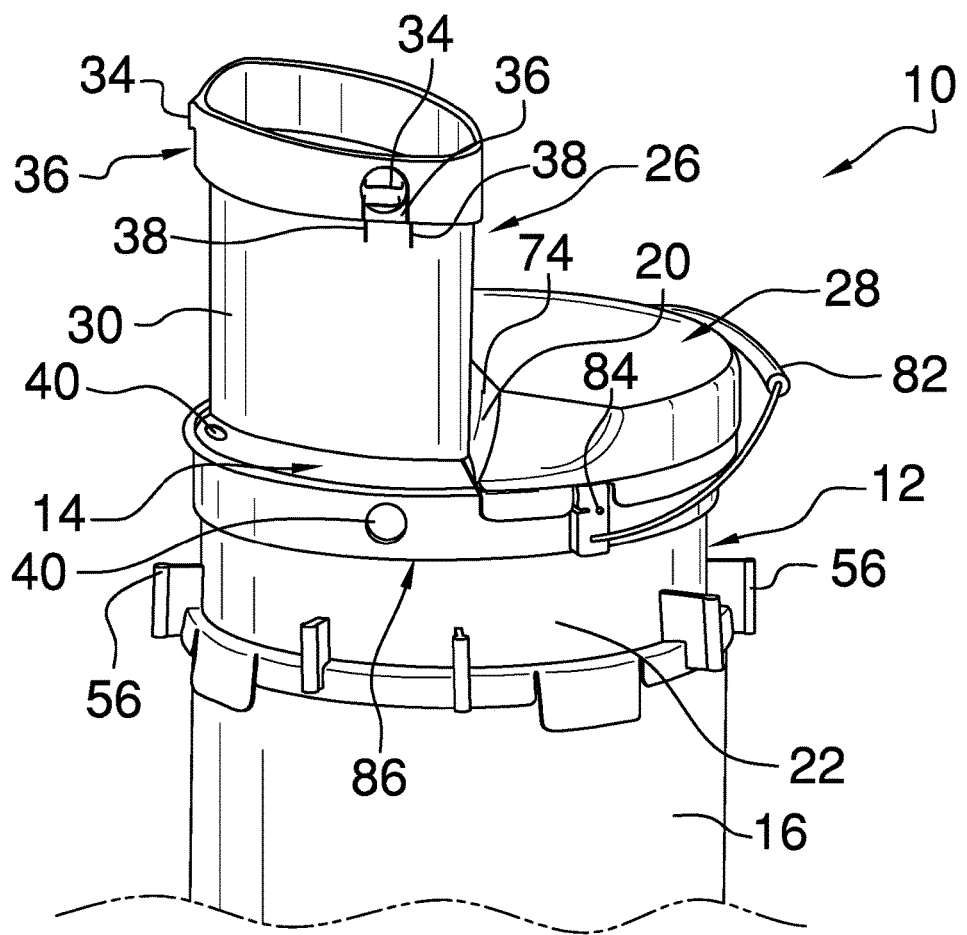
FIG. 1 is a partially exploded top front side perspective view of a multiple purpose ice fishing bucket lid device according to an embodiment of the disclosure.
Figure 2:
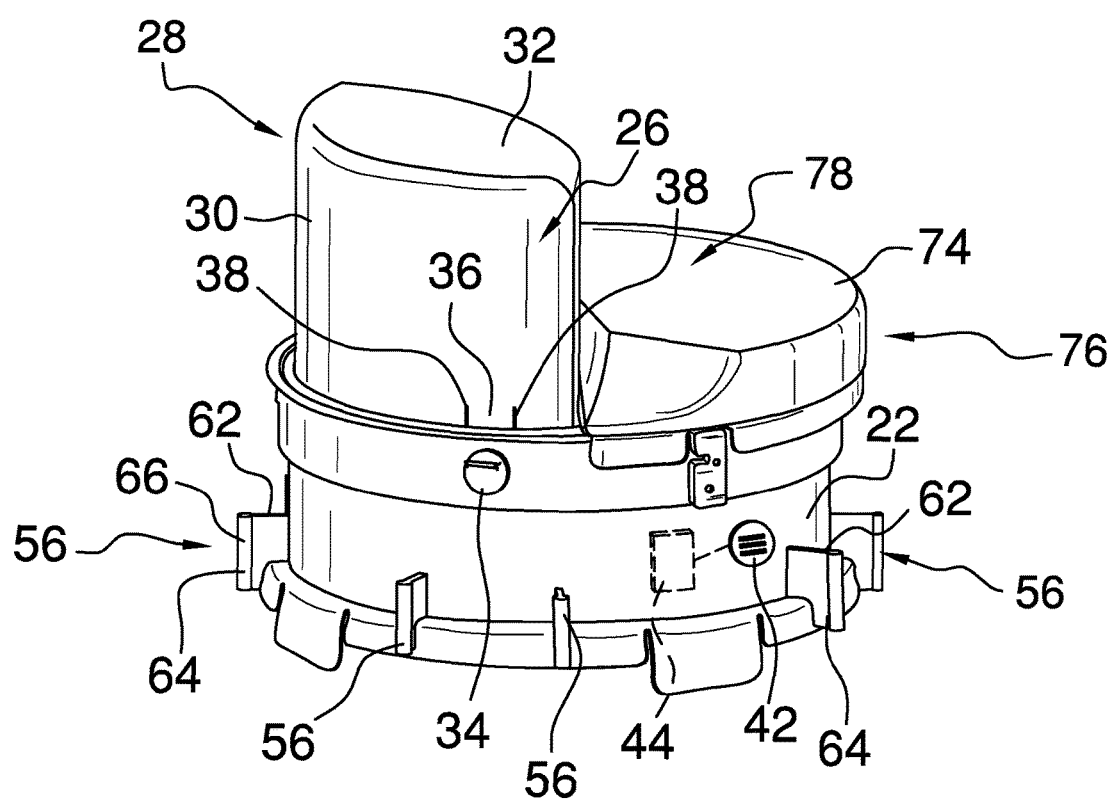
FIG. 2 is a top front side perspective view of an embodiment of the disclosure.
Figure 3:
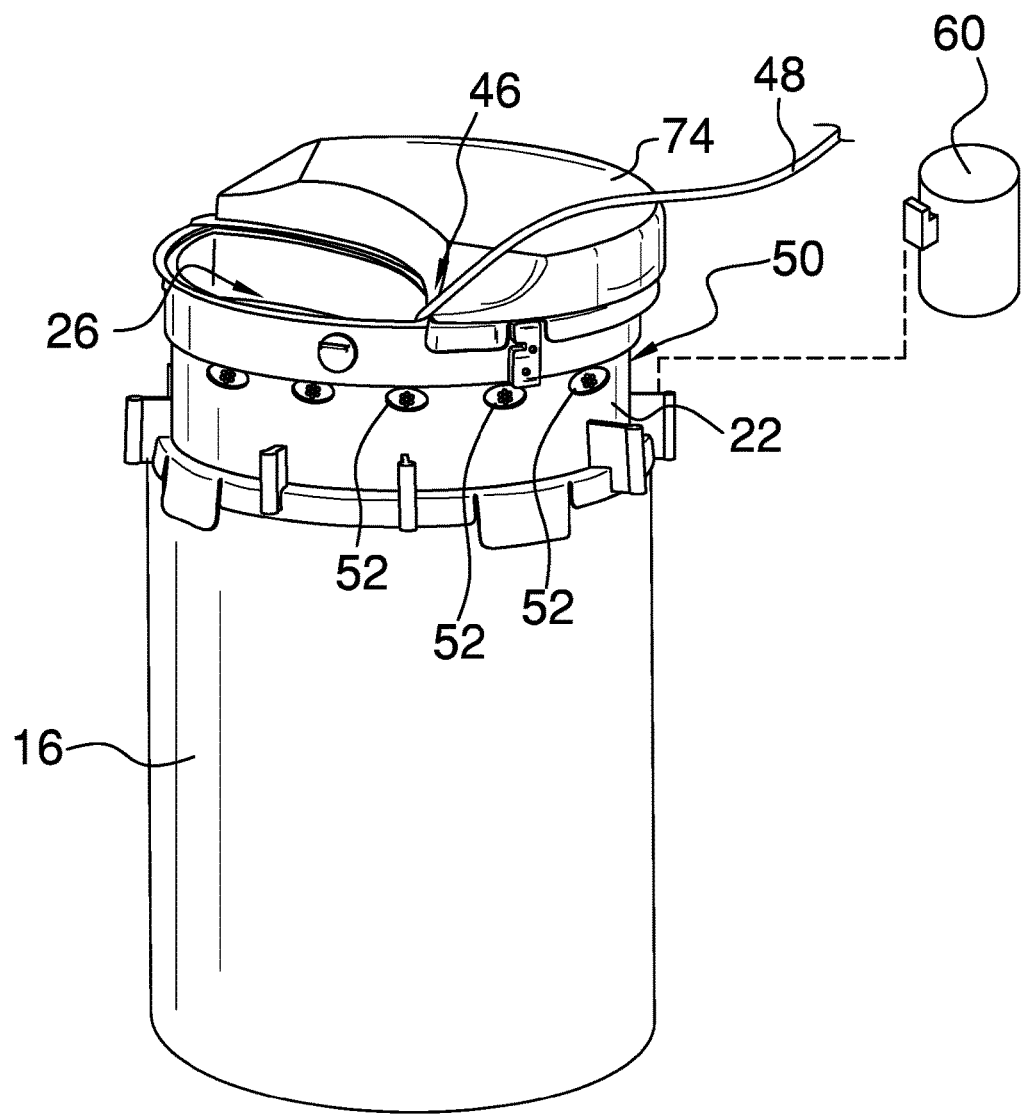
FIG. 3 is a top front side perspective view of an embodiment of the disclosure.
Figure 4:
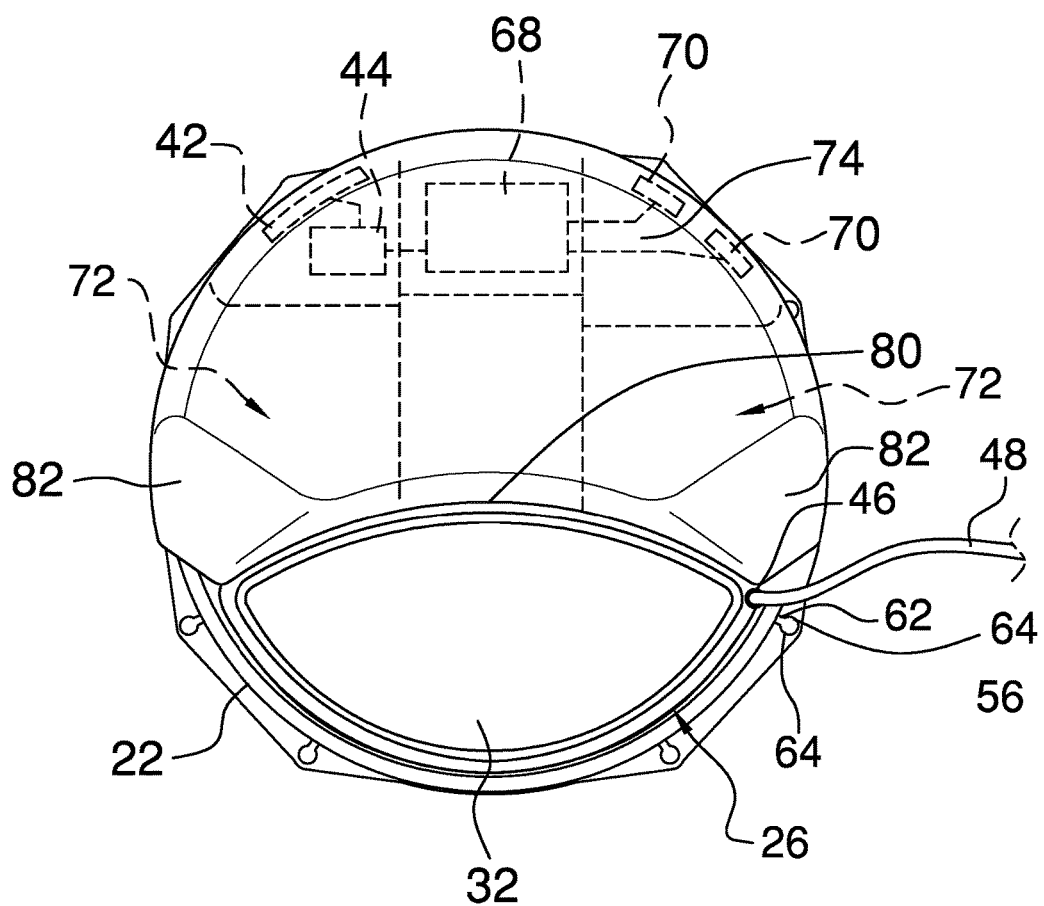
FIG. 4 is a top view of an embodiment of the disclosure.
Figure 5:
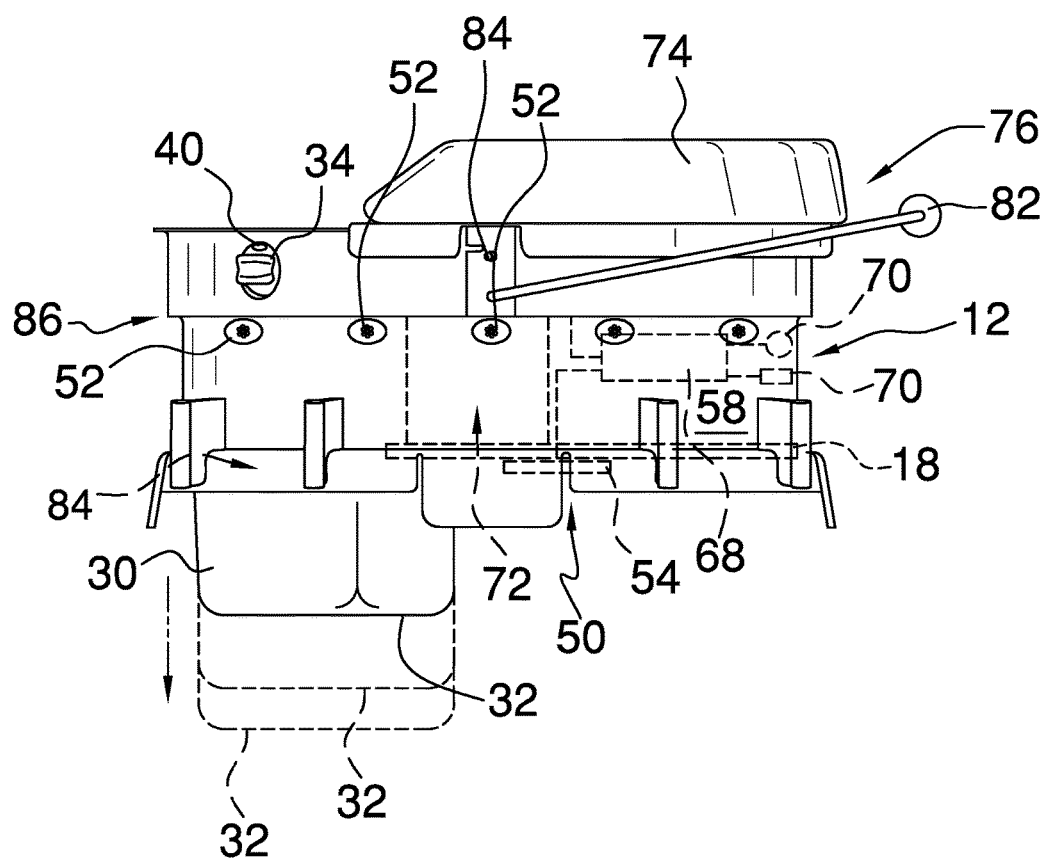
FIG. 5 is a side view of an embodiment of the disclosure.

With reference now to the drawings, and in particular to FIGS. 1 through 5 thereof, a new bucket lid device embodying the principles and concepts of an embodiment of the disclosure and generally designated by the reference numeral 10 will be described.

As best illustrated in FIGS. 1 through 5, the multiple purpose ice fishing bucket lid device 10 generally comprises a housing 12 defining an interior space 14. The housing 12 is configured for coupling to a bucket 16 such as a conventional five gallon bucket. The housing 12 is coupled to the bucket 16 such that the housing 12 covers the bucket 16. The connection may be secured by clips, tabs, or the like engaging an upper rim of the bucket 16 in a conventional manner. The housing 12 comprises a bottom wall 18, a top wall 20, and a perimeter wall 22 coupled to and extending upwardly from the bottom wall 18. The top wall 20 is coupled to the perimeter wall 22 in spaced relationship to the bottom wall 18 defining an interior space 14 of the housing 12.

A pail 26 is couplable to the housing 12 wherein the pail 26 extends into the interior space 14 such that the pail 26 is configured for holding bait or other items to be accessible to a user. The pail 26 is couplable to the housing 12 in an inverted position 28 wherein the pail 26 is configured for extending upwardly relative to the top wall 20 defining an elongated vertical compartment with the interior space 14 and the bucket 16 configured for holding an ice fishing rod or a similar elongated tool or object. A peripheral wall 30 of the pail 26 defines an ovoid shape extending upwardly as viewed parallel to a bottom 32 of the pail 26. Each of a pair of protrusions 34 extends from the peripheral wall 30 of the pail 26. Each protrusion 34 is positioned on a respective flexible arm 36 defined by a respective pair of parallel slits 38 in the peripheral wall 30 of the pail 26. Thus, each protrusion 34 may be pushed inwardly such that the flexible arm 36 pivots the protrusion inwardly. Each of a pair of holes 40 extends through the perimeter wall 22 of the housing 12. Each protrusion 38 extends into a respective one of the holes 40 when the pail 26 is inserted into the housing 12. The holes 40 are symmetrically positioned wherein the protrusions 34 engage the holes 40 when the pail 26 is inserted into the housing 12 in the inverted position 28. The pail 26 may be provided in various lengths as demonstrated by the ghost lines in FIG. 5 and multiple pails 26 may be provided to be interchangeably coupled to the housing 12. The bottom wall 18 has an opening 84 extending therethrough aligning with the insertion of the pail 26 through the top wall 20.

A speaker 42 is coupled to the housing 12. A receiver 44 is coupled to the housing 12. The speaker 42 is operationally coupled to the receiver 44 wherein the receiver 44 is configured for broadcasting audio received from an extrinsic audio source through a personal access network through the speaker 42.

An aperture 46 extends through the housing 12 wherein the housing 12 is configured for extending a bubbler line 48 into a liquid held in the bucket 16. Thus, fish may be held in the bucket for an extended time without suffering from a depletion of oxygen.

Each of a plurality of lights 50 is coupled to the housing 12. The lights 50 include a plurality of external lights 52 arranged in spaced relationship extending a full circumference around the perimeter wall 22 of the housing 12. The external lights 52 may be incorporated into a single rope of light emitting diode type lights. The external lights 52 are directed outwardly from the housing 12 wherein the external lights 52 are configured for directly illuminating an area surrounding the bucket 16. A lip 86 extends around the housing 12 above the external lights 52. The lip 86 directs illumination from the external lights 52 generally downwardly and prevents the external lights 52 from shining directly in the eyes of a user near the housing 12. The plurality of lights 50 further includes an internal light 54. The internal light 54 is directed downwardly relative to the housing 12 wherein the internal light 54 is configured for directing illumination into a liquid held in the bucket 16 allowing the liquid to diffuse the illumination producing an indirect lighting effect through the bucket 16.

At least one mount 56 is coupled to an exterior surface 58 of the perimeter wall 22 wherein the perimeter wall 22 is configured for supporting an extrinsic tool 60 coupled to the mount 56. The mount 56 may be one of a plurality of mounts 56 coupled to the perimeter wall 22. Various extrinsic tools 60 including but not limited to rod holders, drink holders, camera holders, hand tools, tables, platforms, audio device holders, clippers, knives, fishing equipment, and the like may be provided with clips for engaging one of the mounts 56. The mounts 56 may be uniform comprising a central flange 62 and a pair of tapered side flanges 64 coupled to and extending laterally from a distal edge 66 of the central flange 62 relative to the perimeter wall 22. Thus, each extrinsic tool 60 can rest on a selectable one of the mounts 56.

A power source 68 is positioned in the housing 12. A power port 70 is coupled to the perimeter wall 22 of the housing 12. The power port 70 is electrically coupled to the power source 68 wherein the power port 70 is configured for providing electrical power to an extrinsic device coupled to the power port 70. The power source 68 may be a battery and may also electrically connected to the receiver 44 and lights 50. The power source 68 may be centrally positioned within the interior space 14 and sized less than the total volume of the interior space 14 to provide a plurality of compartments 72 in the interior space 14 of the housing 12.

A cushion 74 is pivotally coupled to the housing 12. The cushion 74 may be integral to or coupled to the top wall 20 such that the cushion 74 covers the compartments 72 when the cushion 74 is positioned in a closed position 76 over the interior space 14 wherein the cushion 74 defines a seat 78 to support a user. The cushion 74 is crescent shaped. A concave section 80 of the cushion 74 is complementary to the peripheral wall 30 of the pail 26 wherein the cushion 74 is positionable adjacent to the pail 26. The cushion 74 also has a pair of sloped surfaces 82 positioned at opposite ends of the opening for the pail 26.

A handle 82 may be coupled to the perimeter wall 22. The handle 82 may be of a conventional type pivotally coupled to the perimeter wall 22. A handle stop 84 is positioned on the perimeter wall 22 vertically spaced above a pivot point of the handle 82 such that the handle 82 rests against and is supported in an upward position by the handle stop 84. The handle stop 84 further serves to abut the handle 82 preventing tipping of the housing 12 when the housing 12 is carried by the handle 82 without being attached to the bucket 16.

In use, the device 10 is coupled to a conventional five gallon bucket of the type commonly used while ice fishing. The device 10 may also be used with a pre-existing bucket of any volume having the appropriately sized uppermost edge to be engaged by the housing 12. The interior of the bucket remains accessible through the housing 12 when the pail 26 is removed. The pail 26 is oriented as desired such as being inverted for carrying rods having a length too great to fit within the bucket 16 using a conventional flat lid. Alternatively, the pail 26 may extend into the housing 12 providing a reservoir for bait which is movable to provide access to the interior of the bucket for storage of caught fish. The lights 50, speaker 42, and receiver 44 may be used to illuminate surroundings and play music or recorded books for listening to while fishing. Various other extrinsic devices may be used by attachment to one or more of the mounts 56.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A multiple purpose bucket lid device comprising:
a housing defining an interior space, said housing being configured for coupling to a bucket such that said housing covers said bucket, said housing comprising a bottom wall, a top wall, and a perimeter wall coupled to and extending upwardly from said bottom wall, said top wall being coupled to said perimeter wall in spaced relationship to said bottom wall defining said interior space of said housing;
a pail, said pail including a peripheral wall, said peripheral wall of said pail defining an ovoid shape extending upwardly parallel to a bottom of said pail, said pail being couplable to said housing wherein said pail extends into said interior space such that said pail is configured for holding bait, said pail being couplable to said housing in an inverted position wherein said pail is configured for extending upwardly relative to said top wall defining an elongated compartment with said interior space configured for holding an ice fishing rod;
a speaker coupled to said housing;
a receiver coupled to said housing, said speaker being operationally coupled to said receiver wherein said receiver is configured for broadcasting audio received through a personal access network through said speaker;
an aperture extending through said housing wherein said housing is configured for extending a bubbler line into a liquid held in the bucket;
a plurality of lights coupled to said housing, said lights including a plurality of external lights being arranged in spaced relationship extending a full circumference around said perimeter wall of said housing;
a power source positioned in said housing;
a power port coupled to said perimeter wall of said housing, said power port being electrically coupled to said power source wherein said power port is configured for providing electrical power to an extrinsic device coupled to said power port;
a protrusion extending from said peripheral wall of said pail, said protrusion being positioned in a flexible arm defined by a pair of parallel slits in said peripheral wall of said pail; and
a hole extending through said perimeter wall of said housing, said protrusion extending into said hole when said pail is inserted into said housing wherein said protrusion couples said pail to said housing.

2. The device of claim 1, further comprising said external lights being directed outwardly from said housing wherein said external lights are configured for directly illuminating an area surrounding the bucket.

3. The device of claim 1, further comprising said lights comprising an internal light, said internal light being directed downwardly relative to said housing wherein said light is configured for illuminating a liquid held in the bucket.

4. The device of claim 1, further comprising a mount being coupled to an exterior surface of said perimeter wall wherein said perimeter wall is configured for supporting an extrinsic tool coupled to said mount.

5. The device of claim 4, further comprising said mount being one of a plurality of mounts coupled to said perimeter wall.

6. The device of claim 1, further comprising a plurality of compartments in said interior space of said housing.

7. The device of claim 1, further comprising a cushion, said cushion being positionable to rest on said top wall of said housing wherein said cushion defines a seat.

8. The device of claim 7, further comprising said cushion being crescent shaped, a concave section of said cushion being complementary to said peripheral wall of said pail wherein said cushion is positionable on said top wall adjacent to said pail.

9. A multiple purpose bucket lid device comprising:

a housing defining an interior space, said housing being configured for coupling to a bucket such that said housing covers said bucket, said housing comprising a bottom wall, a top wall, and a perimeter wall coupled to and extending upwardly from said bottom wall, said top wall being coupled to said perimeter wall in spaced relationship to said bottom wall defining said interior space of said housing;

a pail, said pail being couplable to said housing wherein said pail extends into said interior space such that said pail is configured for holding bait, said pail being couplable to said housing in an inverted position wherein said pail is configured for extending upwardly relative to said top wall defining an elongated compartment with said interior space configured for holding an ice fishing rod, a peripheral wall of said pail defining an ovoid shape extending upwardly parallel to a bottom of said pail;

a pair of protrusions extending from said peripheral wall of said pail, each said protrusion being positioned on a respective flexible arm defined by a respective pair of parallel slits in said peripheral wall of said pail;

a pair of holes extending through said perimeter wall of said housing, each said protrusion extending into a respective one of said holes when said pail is inserted into said housing, said holes being symmetrically positioned wherein said protrusions engage said holes when said pail is inserted into said housing in said inverted position;

a speaker coupled to said housing;

a receiver coupled to said housing, said speaker being operationally coupled to said receiver wherein said receiver is configured for broadcasting audio received through a personal access network through said speaker;

an aperture extending through said housing wherein said housing is configured for extending a bubbler line into a liquid held in the bucket;

a plurality of lights coupled to said housing, said lights including a plurality of external lights being arranged in spaced relationship extending a full circumference around said perimeter wall of said housing, said external lights being directed outwardly from said housing wherein said external lights are configured for directly illuminating an area surrounding the bucket, said plurality of lights including an internal light, said internal light being directed downwardly relative to said housing wherein said light is configured for illuminating a liquid held in the bucket;

a mount being coupled to an exterior surface of said perimeter wall wherein said perimeter wall is configured for supporting an extrinsic tool coupled to said mount, said mount being one of a plurality of mounts coupled to said perimeter wall;

a plurality of compartments in said interior space of said housing;

a cushion, said cushion being pivotally coupled to said housing, said cushion covering said compartments when said cushion is positioned in a closed position resting on said top wall of said housing wherein said cushion defines a seat, said cushion being crescent shaped, a concave section of said cushion being complementary to said peripheral wall of said pail wherein said cushion is positionable on said top wall adjacent to said pail;

a power source positioned in said housing; and a power port coupled to said perimeter wall of said housing, said power port being electrically coupled to said power source wherein said power port is configured for providing electrical power to an extrinsic device coupled to said power port.

\* \* \* \* \*